Aug. 23, 1966     D. J. HAMMERAND ETAL     3,267,757
LOW-RUMBLE PHONOGRAPH TURNTABLE DRIVE SYSTEM
Filed June 12, 1964
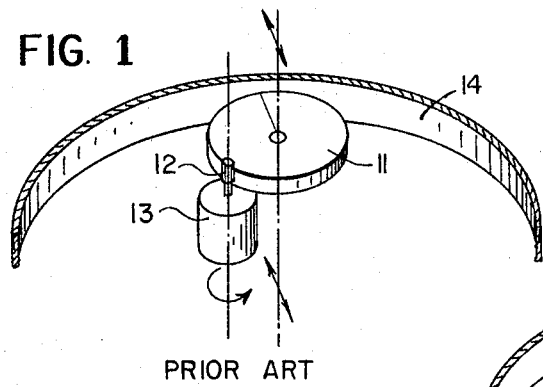
FIG. 1 — PRIOR ART
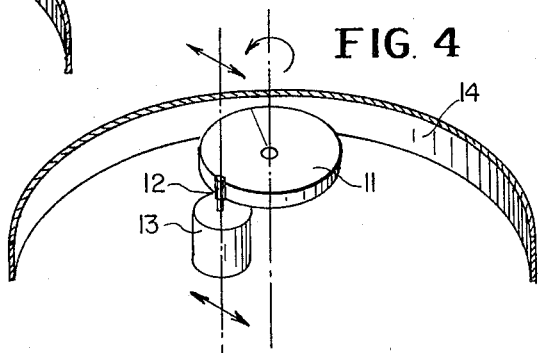
FIG. 4
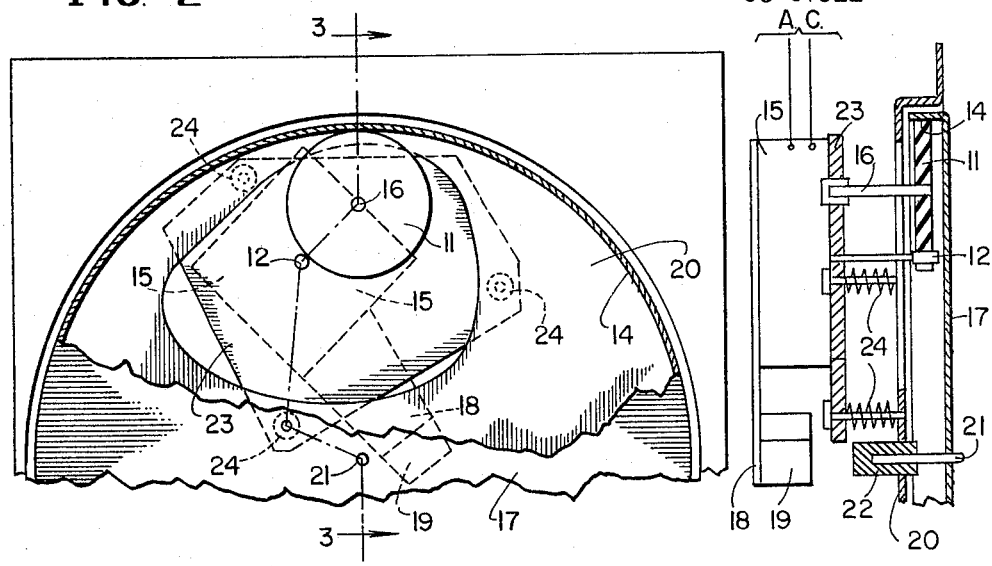
FIG. 2
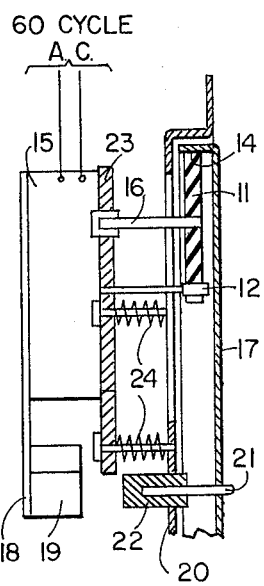
FIG. 3 — 60 CYCLE A.C.
Inventor
Donald J. Hammerand
Allen J. Bury
By Nicholas A. Camasto
Atty.

United States Patent Office 3,267,757
Patented August 23, 1966

3,267,757
LOW-RUMBLE PHONOGRAPH TURNTABLE
DRIVE SYSTEM
Donald J. Hammerand, Franklin Park, and Allen J. Bury, Chicago, Ill., assignors to Admiral Corporation, Chicago, Ill., a corporation of Delaware
Filed June 12, 1964, Ser. No. 374,565
6 Claims. (Cl. 74—206)

This invention relates to electric phonographs. More specifically, it relates to electric phonographs the turntables of which are rotated by a motor drive system in which an electric motor and an idler wheel are combined to drive the turntable. In the environment in which the invention will be described, a single-phase A.C. motor is used to cause the turntable to rotate at a predetermined speed. It is to be understood, however, that this embodiment is merely for convenience in describing the invention, and the invention is not to be so limited.

A major consideration in the manufacture of an electric phonograph is the minimizing of unwanted signals which are derived from noise producing elements within the system, and which are translated by the phonograph as distortion of the sounds being reproduced. This noise stems from two major sources. The first of these is cyclic variation in the speed of the turntable, which variation is caused by such factors as unbalance of the system, eccentricity of the turntable or of the components driving the turntable, flat spots or run-out in the turntable rotor shaft, etc.

The second of the two major sources of noise is vibration of the system as a whole, especially those vibrations which are translated to the phonograph turntable. Noise components induced by such vibrations are termed "rumble." This specification will discuss briefly the origins of the specific vibrations which cause rumble, and the means whereby the invention controls these vibrations.

A common mechanism for inducing rotation of a phonograph turntable comprises an idler wheel unitarily mounted with an electric motor. The idler wheel in such a mechanism is driven at a predetermined speed by an extension of the rotor of the electric motor, and is in frictional engagement with the phonograph turntable, thereby translating its rotational motion to the turntable.

This method is well suited for a mass produced phonograph, mainly due to the fact that the motor-idler wheel unit is preassembled, and the unit as a whole affixed to the phonograph at a convenient point on the assembly line. The idler wheel, being unitarily mounted with the motor, can be preadjusted to insure its proper angular velocity, thus insuring uniformity in the angular velocities of the turntables so driven. The economy inherent in this method should be obvious.

The motor used to drive the idler wheel is usually a single-phase A.C. motor. Its rotor is rotated by a torque caused by the interaction of the magnetic field set up in the stator with the current carrying conductors within the rotor. A current flowing through the field coils produces this magnetic field. However, since this current is an alternating current of sixty cycles per second (60 c.p.s.), the current flowing through the field coils becomes zero one hundred and twenty times each second. The torque on the rotor, being a function of this magnetic field, also becomes zero one hundred and twenty times each second.

The torque produced on the rotor is, therefore, a periodic function having a frequency of one hundred and twenty cycles per second (120 c.p.s.) or, in a more general case, having a frequency of twice the line voltage. This fluctuation in the torque acting on the rotor can be approximated by a periodic impulse acting on the rotor, and consequently is called a "torque pulse." The high rotational inertia of the rotor tends to resist any changes in its angular velocity, and these torque pulses therefore occasion a reaction in the stator, which takes the form of a clockwise and counterclockwise twisting of the frame of the motor.

The clockwise and counterclockwise twisting of the motor occur symmetrically about some axis of gyration, this axis being determined by the mass distribution of the motor system. In most phonograph motors in use today, the axis of gyration substantially coincides with the axis of rotation of the rotor. There is then, in effect, a twisting of the frame of the motor about the axis of its rotor.

The idler wheel, being unitarily mounted with the motor, but not being concentric with the rotor, undergoes lateral motion as a result of this twisting, this motion being along an arc of a circle which has as its center the axis of rotation of the rotor. This motion is essentially perpendicular to the turntable at the point of engagement between the idler wheel and the turntable and, as a consequence, the idler wheel is impelled into the turntable at the same frequency as is exhibited by the gyrations of the motor drive system as a whole (i.e., 120 c.p.s.).

This lateral motion of the idler wheel is translated by the vibrations which it induces in the turntable into the 120 c.p.s. component of the rumble previously referred to. It is this source of 120 c.p.s. rumble that the invention eliminates.

Consequently, it is an object of this invention to provide an improved motor design for an electric phonograph.

Another object of this invention is to provide a motor design for an electric phonograph which eliminates a major cause of 120 c.p.s. rumble component.

Still another object of the invention is to provide an improved motor drive system for an electric phonograph which translates undesirable lateral motion of the idler wheel of the system into rotational motion.

A further object of the invention is to provide means for translating the axis of gyration of a phonograph turntable drive system to substantially coincide with the axis of rotation of the idler wheel of said system.

A still further object of the invention is to provide a phonograph turntable drive system wherein the normal mass distribution is altered by positioning additional mass such that the natural or induced gyrations of the system will occur about a predetermined axis.

Further objects of the invention will become evident to those possessed of skill in the art by reading the specification in conjunction with the attached drawing in which:

FIGURE 1 is a schematic drawing of a prior art phonograph turntable drive system, indicating only the idler wheel, the motor driving the idler wheel and the flange by means of which the idler wheel rotates the turntable, with arrows indicating the directions of the induced vibrations of the system;

FIGURE 2 shows a partial-top view of a phonograph turntable drive system constructed in accordance with the invention with a position of the turntable cut away;

FIGURE 3 shows a side-sectional view of a phonograph turntable drive system constructed in accordance with the invention taken along section 3—3 of FIGURE 2; and FIGURE 4 is a schematic drawing of a phonograph turntable drive system constructed in accordance with the invention showing only the idler wheel, the motor driving the idler wheel and the flange by means of which the idler wheel rotates the turntable, with arrows indicating the directions of the induced vibrations of the system.

Referring now to FIGURE 1, a prior art phonograph turntable drive system is shown schematically. In this system an idler wheel 11 is rotated by an extension 12 of a rotor 13. Upon rotating, idler wheel 11 drives a flange 14 with which it is in frictional contact. The system which comprises idler wheel 11, rotor 13 and rotor extension 12, undergoes gyrational motion about an axis substantially coinciding with the axis of rotor 13, this gyrational motion being due to torque pulses within the motor (not shown) of rotor 13.

The system, being unitarily mounted, can be thought of as a lever pivoting about one end. The pivot point can be considered as coinciding with the axis of rotor 13, and the free end as coinciding with the axis of idler wheel 11. Being thus mounted, idler wheel 11 moves laterally on an arc of a circle having the axis of rotor 13 as its center, as the system gyrates about the axis of rotor 13. The gyratory motion of the system and the lateral motion of idler wheel 11 in prior art phonograph drive systems is shown by arrows in FIGURE 1. It is obvious that movement of idler wheel 11 in the directions indicated will impel idler wheel 11 into flange 14 each time that the system as a whole undergoes one cycle of gyration. Idler wheel 11 thus translates vibrations to flange 14, which vibrations are picked up by a phonograph cartridge (not shown) and reproduced as rumble.

FIGURES 2 and 3 show, respectively, a partial-top view and a side-sectional view of a phonograph turntable drive system constructed in accordance with the invention, wherein an electric motor 15 is shown connected to a 60 cycle alternating-current source.

A turntable 17 is rotatably mounted on a pan 20 with a spindle 21 and a bearing 22, and has a flange 14 (shown in section) connected thereto. Idler wheel 11 is unitarily mounted with motor 15 on a base 23, which mounting is effected by a bearing shaft 16. Base 23, in turn, is affixed to pan 20 by spring mounts 24. These spring mounts usually are rubber grommets, and serve to absorb some of the vibrations produced in motor 15. Idler wheel 11 is in frictional engagement with rotor extension 12 and with flange 14 such that it translates the rotational motion of rotor 12 to flange 14 and, consequently, to turntable 17.

What has been described up to this point essentially comprises the turntable drive system used in most present day phonographs. The description has been brief because it is felt that the mechanisms and principles involved are well known to those skilled in the art.

In order that the rumble component of such a system be minimized, the inventors have affixed a platform 18 to motor 15, which platform positions a mass 19 at a predetermined point in the system, thereby altering the mass distribution of the system and, consequently, the axis of gyration of the system. The magnitude of mass 19, and its position, are chosen such that the axis of gyration is translated to substantially coincide with the axis of idler wheel 11.

In positioning mass 19, care must be exercised to insure that only the horizontal component of the mass distribution is changed. If this precaution is not observed, the change in the vertical component of the mass distribution will occasion a change in the plane of the gyration of the system, thus giving rise to new vibrations in the process of combating the old.

The effect of so positioning mass 19 is demonstrated in FIGURE 4, wherein is shown a schematic drawing of a phonograph turntable drive system constructed in accordance with the invention. Again, the system is analogous to a lever pivoting about one of its ends, but in this case the pivot point coincides with the axis of idler wheel 11. The system still experiences gyrational motion, but this gyrational motion now occurs about an axis which coincides with the axis of revolution of idler wheel 11. As indicated by the arrows, rotor 13 and rotor extension 12 now experience lateral motion while idler wheel rotates about its axis. The lateral movement of rotor 13 and rotor extension 12 is not objectionable because this motion is in a path parallel to the edge of idler wheel 11 and is such that rotor extension 12 at all times maintains contact with idler wheel 11.

The repositioning of the axis of gyration of the system has, in effect, changed the lateral motion of idler wheel 11, which motion was the cause of the 120 c.p.s. rumble, to rotational motion about its axis. The rotational motion, not translating any vibrations to turntable 17, does not contribute to the rumble component.

Should it prove impractical to locate mass 19 such that the axis of gyration of the system is at precisely the axis of idler wheel 11, substantial benefit of the invention may be obtained by positioning mass 19 such that the axis of gyration of the system lies on a line drawn through the axis of idler wheel 11 and the point at which idler wheel 11 contacts flange 14. With the axis of gyration so located, idler wheel 11 will still undergo lateral movement, but this lateral movement will now be parallel with flange 14. Such parallel movement will prevent idler wheel 11 from being impelled into flange 14 and thus will prevent occurrence of the 120 c.p.s. rumble. While this alternative may induce a slight variation in the speed of the turntable, the sound distortion caused by this variation is insignificant when compared with the rumble which has been eliminated.

What has been described is a novel phonograph turntable drive system which translates undesirable lateral motion of an idler wheel within the system to acceptable rotational motion or, as an alternative, to acceptable lateral motion in a different direction, thereby removing a major cause of rumble from the drive system. While the invention has been described in the environment of a phonograph turntable drive system, wherein a single-phase A.C. motor is used to rotate a turntable at a predetermined speed, it is understood that the invention is not to be so limited and that it is to be limited only by the appended claims.

The embodiments of the invention in which an exclusive property or privilege is claimed are defined as follows:

1. In combination with a phonograph turntable; an electric motor having a drive shaft; an idler wheel frictionally coupled to said turntable and said drive shaft and translating motion from said drive shaft to said turntable; a base plate mounting said motor and said idler wheel and being resiliently supported with respect to said turntable; and mass distribution means coupled to said motor establishing the axis of gyration of said motor and idler wheel substantially on a line joining the axis of said idler wheel and the point of engagement between said idler wheel and said turntable, whereby any torque pulse induced vibrations in said motor are converted into forces substantially tangential to said idler wheel at said point of engagement.

2. The combination of claim 1 wherein said mass distribution means comprises a platform attached to said motor at one end and supporting a mass at the other end.

3. In a rim drive phonograph system of the type wherein there is provided; a motor, rotor shaft and idler wheel assembly unitarily supported on a base plate which is movable relative to the turntable, a source of alternating current for said motor producing torque pulses of twice the frequency of said alternating current within said motor and effecting an oscillatory movement of said assembly at the torque pulse frequency about an axis of gyration substantially coincident with the axis of said rotor shaft thereby effectively varying the contact pressure between the idler and the rim drive turnable and producing vibrations in the turntable at the torque pulse frequency, the improvement comprising; mass distribution means coupled to said assembly translating the axis of gyration thereof substantially to a point on a line joining the axis of said idler wheel and the point of contact between the idler wheel and the turntable whereby said movement is translated into forces at said point of contact which are substantially tangential to said idler wheel.

4. In a rim drive phonograph system of the type wherein there is provided a motor and idler wheel assembly unitarily supported on a base plate which is movable relative to the turntable, said motor having a rotor shaft, a source of alternating current for said motor producing torque pulses of twice the frequency of said alternating current within said motor and effecting an oscillatory movement of said assembly at the torque pulse frequency about an axis of gyration substantially coincident with the axis of said rotor shaft thereby effectively varying the contact pressure between the idler and the rim drive turntable and producing vibrations in the turntable at the torque pulse frequency, the improvement comprising; a platform attached to said motor supporting a predetermined mass a predetermined distance and direction from said motor; said mass, distance and direction being selected to fix the axis of gyration of said assembly substantially at the axis of said idler wheel thereby minimizing variations in contact pressure between said idler wheel and turntable.

5. The system of claim 4 wherein the position of said mass is chosen to maintain the plane of gyration of said assembly horizontal.

6. The system of claim 5 wherein the center of mass of said predetermined mass lies in a plane parallel to the plane of said idler wheel and is coplanar with the center of mass of said assembly.

References Cited by the Examiner

UNITED STATES PATENTS

| | | | |
|---|---|---|---|
| 2,455,280 | 11/1948 | Sweighert | 74—206 |
| 2,572,718 | 10/1951 | Gifford | 74—206 |
| 2,732,724 | 1/1956 | Tateishi | 74—206 |

DAVID J. WILLIAMOWSKY, *Primary Examiner.*

L. H. GERIN, *Assistant Examiner.*